US010100887B2

(12) United States Patent
Graaf et al.

(10) Patent No.: US 10,100,887 B2
(45) Date of Patent: Oct. 16, 2018

(54) BRAKE PAD OF A DISK BRAKE, AND DISK BRAKE

(71) Applicant: KNORR-BREMSE Systeme fuer Nutzfahrzeuge GmbH, Munich (DE)

(72) Inventors: Jutta Graaf, Penzberg (DE); Josef Schropp, Eichendorf (DE); Manfred Schoenauer, Munich (DE)

(73) Assignee: KNORR-BREMSE Systeme fuer Nutzfahrzeuge GmbH, Munchen (DE)

( * ) Notice: Subject to any disclaimer, the term of this patent is extended or adjusted under 35 U.S.C. 154(b) by 170 days.

(21) Appl. No.: 15/044,894

(22) Filed: Feb. 16, 2016

(65) Prior Publication Data

US 2016/0160946 A1 Jun. 9, 2016

Related U.S. Application Data

(63) Continuation of application No. PCT/EP2014/002247, filed on Aug. 14, 2014.

(30) Foreign Application Priority Data

Aug. 16, 2013 (DE) .................. 10 2013 013 687

(51) Int. Cl.
 *F16D 65/097* (2006.01)
 *F16D 55/226* (2006.01)
(52) U.S. Cl.
 CPC ....... *F16D 65/0978* (2013.01); *F16D 55/226* (2013.01)
(58) Field of Classification Search
 CPC .................. F16D 65/0978; F16D 55/226
 See application file for complete search history.

(56) References Cited

U.S. PATENT DOCUMENTS

| 5,875,873 | A | * | 3/1999 | Kay ................. F16D 55/224 188/73.37 |
| 8,016,084 | B2 | | 9/2011 | Camilo-Martinez et al. |
| 2007/0251772 | A1 | | 11/2007 | Tsurumi |
| 2009/0211857 | A1 | * | 8/2009 | Camilo-Martinez .............. F16D 65/0978 188/250 B |
| 2010/0276232 | A1 | * | 11/2010 | Keller ............... F16D 65/0977 188/73.31 |

FOREIGN PATENT DOCUMENTS

| CN | 101063470 A | 10/2007 |
| CN | 101595322 A | 12/2009 |
| DE | 693 25 306 T2 | 11/1999 |

(Continued)

OTHER PUBLICATIONS

Chinese Office Action issued in counterpart Chinese Application No. 201480051451.6 dated May 3, 2017 with English translation (nine pages).

(Continued)

*Primary Examiner* — Vishal R Sahni
(74) *Attorney, Agent, or Firm* — Crowell & Moring LLP (57) ABSTRACT

A brake pad of a disk brake, includes at least one friction pad attached to a pad carrier and has a locking device, which is arranged on the pad carrier and which has a spring element and a securing element. The spring element and the securing element of the locking device are coupled to each other in a form-closed manner as two separate parts and can be pivoted in relation to each other. A disk brake is equipped with such brake pads.

27 Claims, 8 Drawing Sheets

(56) References Cited

FOREIGN PATENT DOCUMENTS

| | | |
|---|---|---|
| DE | 10 2007 049 980 A1 | 4/2009 |
| DE | 10 2008 019 265 A1 | 10/2009 |
| DE | 10 2008 051 236 A1 | 4/2010 |
| DE | 10 2009 030 414 A1 | 1/2011 |
| DE | 10 2010 023 143 A1 | 12/2011 |
| EP | 0 565 337 B1 | 6/1999 |
| EP | 1 491 789 A2 | 12/2004 |
| SU | 1254223 A1 | 8/1986 |
| SU | 1831609 A3 | 7/1993 |
| WO | WO 2007/068464 A1 | 6/2007 |

OTHER PUBLICATIONS

Russian Office Action issued in counterpart Russian Application No. 2016109260/11 dated May 24, 2017 with English translation (14 pages).
International Preliminary Report on Patentability (PCT/IB/326, PCT/IB/338 & PCT/IB/373) issued in PCT Application No. PCT/EP2014/002247 dated Feb. 25. 2016, including English translation of document C3 (German-language Written Opinion (PCT/ISA/237)) previously filed on Feb. 16, 2016 (eight pages).
International Search Report (PCT/ISA/210) issued in PCT Application No. PCT/EP2014/002247 dated Nov. 26, 2014 with English translation (six pages).
German Office Action issued in counterpart German Application No. 10 2013 013 687.3 dated May 6, 2014 (six pages).
German-language Written Opinion (PCT/ISA237) issued in PCT Application No. PCT/EP2014/002247 dated Nov. 26, 2014 with English translation (nine pages).

* cited by examiner

PRIOR ART

US 10,100,887 B2

BRAKE PAD OF A DISK BRAKE, AND DISK BRAKE

CROSS REFERENCE TO RELATED APPLICATIONS

This application is a continuation of PCT International Application No. PCT/EP2014/002247, filed Aug. 14, 2014, which claims priority under 35 U.S.C. § 119 from German Patent Application No. 10 2013 013 687.3, filed Aug. 16, 2013, the entire disclosures of which are herein expressly incorporated by reference.

BACKGROUND AND SUMMARY OF THE INVENTION

The present invention relates to a brake pad of a disc brake having at least one friction pad mounted on a pad carrier, and having a locking device arranged on the pad carrier and having a spring element and a securing element. The invention also relates to a corresponding disc brake.

Brake pads of this kind are used in disc brakes for vehicles. In this case, the brake pads are accommodated in pad slots of a brake carrier. A pad slot of this kind is delimited at the sides by "brake carrier horns".

Normally, the lateral functional surfaces of the brake carrier horns are nowadays situated in a position aligned parallel to one another. This can have the effect that the brake pad tilts against the two brake carrier horns when subjected to shaking and hence that a self-locking effect is obtained, i.e. the brake pad is prevented from climbing out of the pad slot. This relieves the load on the pad hold-down springs and protects the tangential contact areas of the brake pads and those in the pad slot of the brake carrier from wear.

As soon as the above-described parallel alignment of the two brake carrier horns is departed from, the self-locking effect disappears, resulting in increased wear on the components involved.

DE 10 2010 023 143 A1 describes a disc brake for a commercial vehicle and a brake pad for a disc brake, which is fitted with a pad holding spring. At least the pad holding spring of a brake pad on the application side has an elastically deformable securing element at each end which is elastically deformable between the associated brake carrier horn and the brake pad. This embodiment has proven its worth per se but it is regarded as disadvantageous that fitting and, in particular, removal of the brake pads entail an increased expenditure of force and also an additional tool.

There is a continual requirement for increased functional reliability and simplicity of fitting during production and servicing.

It is the underlying object of the invention to provide an improved brake pad.

Another object consists in providing an improved disc brake.

The invention achieves this and other objects by providing a brake pad of a disc brake having at least one friction pad mounted on a pad carrier, and having a locking device arranged on the pad carrier and having a spring element and a securing element. The invention also relates to a corresponding disc brake. The spring element and the securing element of the locking device are coupled positively to one another as two separate parts and can be pivoted relative to one another. A further object is achieved by a disc brake having such a brake pad.

By forming the locking device with two separate parts which are coupled positively and can be moved relative to one another, not only simple fitting but also easy removal of the brake pad are made possible.

A disc brake pad according to the invention includes at least one friction pad mounted on a brake carrier, and a locking device arranged on the pad carrier and having a spring element and a securing element. The spring element and the securing element of the locking device are coupled positively to one another as two separate parts and can be pivoted relative to one another.

A disc brake according to the invention, in particular a sliding caliper disc brake, for a vehicle comprises a brake caliper, a fixed-location brake carrier, which has two pairs of brake carrier horns, by each of which one brake pad is held, and at least one pad holder. At least one brake pad is designed in accordance with the invention, and at least one of the two pairs of brake carrier horns with which the at least one brake pad according to the invention is in contact has a recess, which interacts with the locking section of the locking device of the at least one brake pad according to the invention.

In the installed state of the brake pad, one section of the securing element of the locking device interacts with the recess in the associated brake carrier horn.

In one embodiment, the locking device can be moved out of an unlocked position, in which a locking section of the securing element is accommodated in a recess in the pad carrier, into a locking position, in which the locking section of the securing element projects laterally from the pad carrier in order to interact with a recess in a brake carrier horn of a disc brake to be associated therewith, and back out of said position. In this way, simple fitting during the insertion of the brake pad is possible without the need for an additional expenditure of force or an additional tool.

Further advantageous embodiments of the brake carrier according to the invention are described herein.

In another embodiment, the spring element has a slot extending in the longitudinal direction of the spring element in each end region of a spring body, and the securing element has a body having a slot-type opening, wherein the body is formed at one end with a locking section and is coupled at another end to the spring element. Simple production of the separate parts, e.g. by punching and bending operations, is thus possible.

Provision is made for the spring element and the securing element to be coupled positively in this way by one slot in a coupling section in one end region of the spring element being in engagement with the other end of the securing element. In this way, simple assembly of the parts is achieved.

In another embodiment, it is envisaged that the other end of the securing element, i.e., the end in engagement with one slot in the spring element, has a narrow connecting section, which connects the body of the securing element to a transverse end. The narrow connecting section is accommodated movably in the slot in the coupling section of the spring element. This results in a further advantage of rapid assembly of the locking device.

In another embodiment, the locking device is arranged on an upper side of the pad carrier in a manner which allows it to be removed again in such a way that a projection of the pad carrier is arranged in the slot-type opening in the securing element and a guide projection of the pad carrier is arranged in the slot in the coupling section of the spring element. A further guide projection of the pad carrier is arranged in the slot in the spring element. In this way, very advantageous fitting, removal and reuse of the locking device is possible.

Another embodiment envisages that the locking device is arranged on the upper side of the pad carrier in a manner which allows it to be removed again in such a way that a support end of the spring element, said end being adjacent to the other slot in the spring element, rests on the upper side of the pad carrier in the locking position of the locking device. The coupling section of the spring element rests by way of its underside on an upper side of the locking element and presses the locking element onto the upper side of the pad carrier. In this way, it is advantageously ensured that the locking element can be coupled in a simple and effective manner to the spring element.

In an alternative embodiment, the other end of the securing element, i.e., the end in engagement with one slot in the spring element, has a coupling section having a coupling opening, wherein a section between the body of the securing element and the coupling section is accommodated movably in the slot in the coupling section of the spring element. This is a simple design with parts that are simple to produce.

In another embodiment, the locking device furthermore includes a coupling member, which is connected pivotably to the coupling section of the securing element at a pivoting axis, and which is connected pivotably to a projection on the upper side of the pad carrier at a further pivoting axis. An advantageous positive movement of the securing element around the pivoting axis is thereby made possible.

The upper side of the pad carrier of the brake pad is to be understood to mean the narrow side of the pad carrier, which lies opposite the lower side, which rests in the pad slot. The friction pad is mounted on one of the large-area sides of the pad carrier.

In this case, the coupling member has at least one longitudinal section, which is connected at its ends to respective coupling sections, wherein one coupling section is connected pivotably to the coupling section of the securing element and one coupling section is connected pivotably to the projection. Thus, the coupling member can be of U-shaped design or can be designed as a chain link, for example.

In one embodiment, the locking device is arranged on an upper side of the pad carrier in such a way that a projection of the pad carrier is arranged in the slot-type opening in the securing element, and that a guide projection of the pad carrier is arranged in the slot in the coupling section of the spring element, and a further guide projection of the pad carrier is arranged in the slot in the spring element, wherein the coupling member is connected pivotably to the projection of the pad carrier at a pivoting axis. Thus, the locking device is fixed and guided at defined points on the upper side of the pad carrier.

In another embodiment, the locking device is arranged on the upper side of the pad carrier in such a way that a support end of the spring element, said end being adjacent to the other slot in the spring element, rests on the upper side of the pad carrier in the locking position of the locking device. The coupling section of the spring element is arranged between the first coupling member and the locking element, and the coupling section of the spring element rests by way of its underside on the upper side of the locking element and presses the locking element onto the upper side of the pad carrier. A simple construction is thereby advantageously achieved.

In yet another embodiment, the locking device is arranged on the upper side of the pad carrier in a manner which allows it to be removed again in such a way that the coupling member is formed in a U shape with an axial retention device that can be removed again, and/or that the connection of the coupling member to the projection or to the coupling section of the securing element is designed as a clip-type joint. In addition to the advantage of simple fitting, this also results in simple removal and reuse of the locking device.

In another embodiment, the locking device furthermore has a further coupling member, which is connected pivotably to a bearing end of the spring element, said bearing end being formed with an opening, and which is connected pivotably to a bearing projection on the upper side of the pad carrier. In this way, a defined mobility of the locking device can be achieved.

For this purpose, the further coupling member can be connected to the bearing projection in a manner which allows pivoting and sliding, e.g. by use of a slotted hole.

The further coupling member also has at least one longitudinal section, which is connected at its ends to respective coupling sections, wherein one coupling section is connected pivotably to the bearing end of the spring element and one coupling section is connected pivotally to the bearing projection. Of course, embodiment of the further coupling member as a chain link is also possible.

In yet another embodiment, the locking device is arranged on an upper side of the pad carrier in such a way that the projection of the pad carrier is arranged in the slot-type opening in the securing element, and a guide projection of the pad carrier is arranged in the slot in the coupling section of the spring element, and a bearing projection of the pad carrier is arranged in the slot in the spring element. The coupling member is connected pivotably to the projection of the pad carrier at a pivoting axis, and the further coupling member is connected pivotally to the bearing projection.

In yet another embodiment, it is envisaged that the locking device is arranged on the upper side of the pad carrier in such a way that the support end of the spring element rests on the upper side of the pad carrier in the locking position of the locking device. The coupling section of the spring element is arranged between the first coupling member and the locking element, and the coupling section of the spring element rests by way of its underside on the upper side of the locking element and presses the locking element onto the upper side of the pad carrier. This advantageously simple construction allows effective locking.

In one embodiment, the locking device is arranged on the upper side of the pad carrier in a manner which allows it to be removed again in such a way that the further coupling member is formed in a U shape with an axial retention device that can be removed again, and/or that the connection of the further coupling member to the bearing projection or to the bearing end of the spring element is designed as a clip-type joint. This results in advantageous simple fitting and removal and the possibility of reuse.

In one embodiment of the disc brake, the recess is formed in the manner of an undercut. This allows simple interaction with the locking device.

In another embodiment, the locking device of the at least one brake pad is moved out of an unlocked position, in which a locking section of the securing element is accommodated in a recess in the pad carrier, into a locking position, in which the locking section of the securing element of the pad carrier is in engagement in order to interact with the recess in the associated brake carrier horn when the pad holder is fitted. The locking section of the locking element engages in the undercut-type recess in the locking position.

In one embodiment of the disc brake, it is envisaged that the pad holder moves the locking device of the at least one brake pad automatically out of the unlocked position into the locking position when it is fitted. This is advantageously simple and does not require any further changes to the disc brake.

In an alternative embodiment, at least one separate actuating component can be provided for moving the locking device of the at least one brake pad out of the unlocked position into the locking position. For this purpose, it is possible, for example, to use a spring-loaded rotatable pin with a bayonet catch or, alternatively, a screw.

In the installed state, the securing element is secured against tangential movement by a corresponding contour in the brake pad carrier. This is made possible by the corresponding projections.

The spring element of the locking device secures the securing element against radial movement in the installed state of the brake pad.

The securing element furthermore advantageously forms a travel limitation with a defined play which is free of force in the installed state, thereby ensuring that the movement force of the brake caliper is not increased.

In the installed state of the brake pad, the securing element can lift off counter to the spring force of the spring element in the event of overloading in the locked position and thus advantageously forms an integrated overload safeguard.

The two-part locking device with the spring element and the securing element reduces wear in the region of the undercut-type recess in the brake carrier horn and thus reduces play with respect to the brake carrier horn in contrast to a one-piece spring locking element.

Another advantage is that impermissible wear on the brake pad and brake carrier is prevented or considerably reduced, and this can lead to an extended service life for the components and to longer maintenance or replacement intervals.

Illustrative embodiments of a brake pad according to the invention and of a disc brake according to the invention are shown in the drawings and are described in greater detail below, and further advantages of embodiments according to the invention are also explained. In the drawings:

BRIEF DESCRIPTION OF THE DRAWINGS

FIGS. 5-5a show lateral schematic partial views of a variant of the first illustrative embodiment according to FIGS. 3 and 3a;

FIG. 6 shows a schematic plan view in direction VI according to FIGS. 3-3a and 5-5a;

FIG. 7 shows a schematic plan view in direction VII according to FIGS. 3-3a;

FIGS. 8-8d show various variants of coupling members in schematic plan views according to FIGS. 6 and 7;

FIG. 10 shows a schematic perspective view of the second illustrative embodiment of the brake pad according to the invention according to FIGS. 9-9a;

FIG. 11 shows a schematic perspective view of a spring element;

FIG. 12 shows a schematic perspective view of a locking element; and

FIG. 13 shows a schematic perspective view of the locking device of the second illustrative embodiment of the brake pad according to the invention according to FIGS. 9-9a.

DETAILED DESCRIPTION OF THE DRAWINGS

In the text which follows, terms such as "top", "bottom", "right", "left" etc. which relate to orientations in the figures are used. Coordinates x, y, z in the figures serve for additional orientation.

Figure 1:
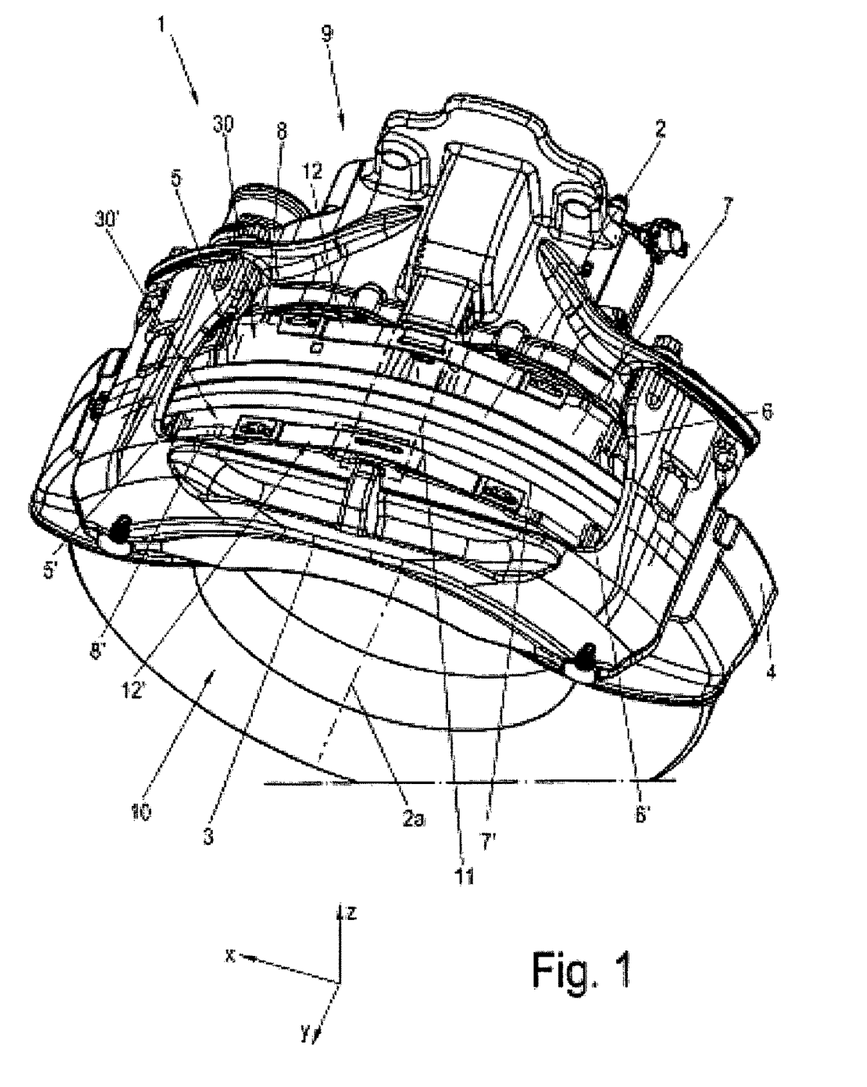
FIG. 1 shows a three-dimensional schematic view of a disc brake according to an embodiment of an embodiment of the invention.

FIG. 1 shows a three-dimensional schematic view of a disc brake 1 according to the invention. The disc brake 1 is assigned to a vehicle for example, in particular a commercial vehicle, and includes a brake disc 2 having a brake disc rotational axis 2a, a brake caliper 3, a brake carrier 4 and at least two brake pads 30, 30', which each have a friction pad 7, 7' on a pad carrier 8, 8'. The brake disc rotational axis 2a extends in the y direction.

Here, the brake caliper 3 is designed as a sliding caliper and is held in a manner not described specifically on the brake carrier 4, which is fixed in location.

An application section of the brake caliper 3 accommodates an application mechanism of the disc brake 1. The application mechanism is used for actuation of the disc brake 1 and can be a pivoted braking lever with a compressed air cylinder, for example. No further details thereof are given here.

The side of the disc brake 1 on which the application section of the brake caliper 3 with the application mechanism is arranged is referred to below as the application side 9. The other side of the disc brake 1, on which the "brake caliper back" is provided, is referred to below as the reaction side 10. These terms "application side" and "reaction side" and other designations referring thereto are conventional and are used for better orientation.

Thus, the brake pad 30 with the friction pad 7 and pad carrier 8, which is situated on the application side 9, is referred to as the application-side brake pad 30, and the opposite pad to the latter is referred to as the reaction-side brake pad 30' with the friction pad 7' and pad carrier 8'.

In the manner of a frame, the brake carrier 4 spans or reaches around a section of the brake disc 2 which is axially on the outside in relation to the brake disc rotational axis 2a. On both sides of the brake disc 2, the brake carrier 4 is provided with brake carrier horns 5, 6 (on the application side) and 5', 6' (on the reaction side), which extend in the z direction and serve to support the two brake pads 30, 30'.

On their upper sides, the brake pads 30, 30' are each provided with a locking device 12, 12', which is described in detail below. A pad holder 11 (see also FIG. 3), shown only in dashed lines, is arranged above the installed brake pads 30, 30', interacts with the locking devices 12, 12', this being explained in detail below, and serves to secure the brake pads 30, 30' in the brake carrier 4.

Figure 2:
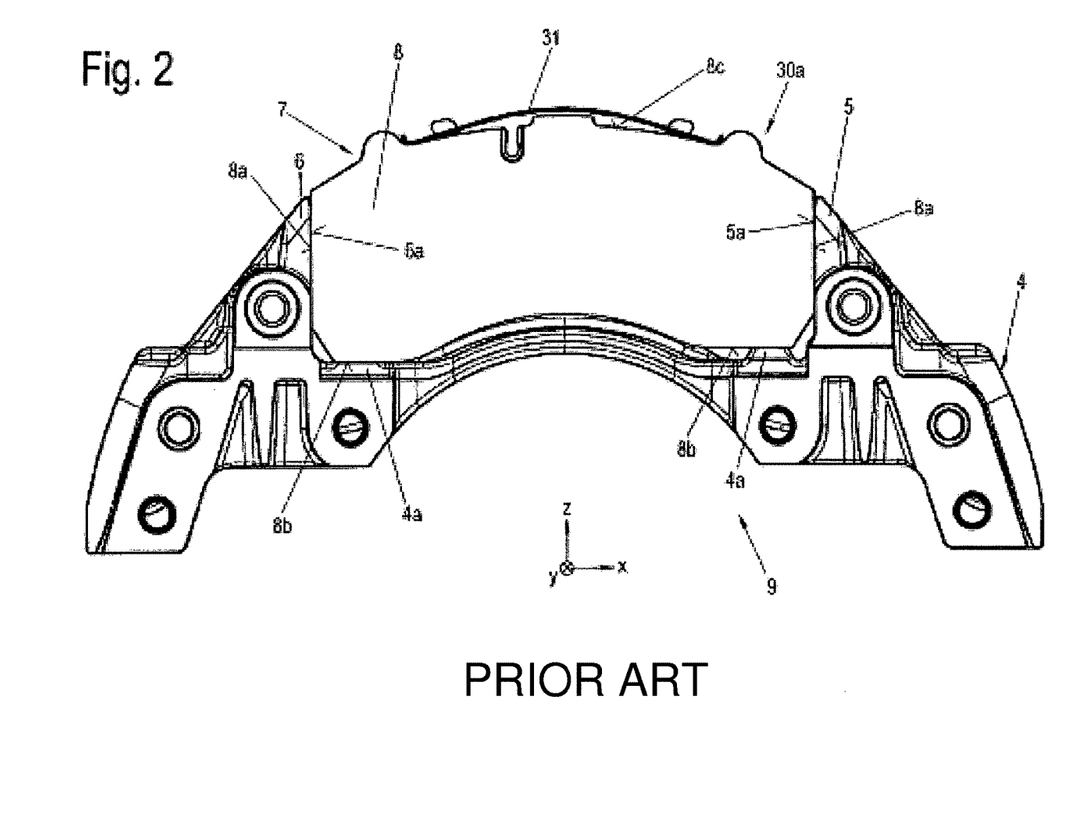
FIG. 2 shows a schematic view of a brake carrier having a brake pad in accordance with the prior art.

A schematic view of a brake carrier 4 having a brake pad 30a according to the prior art is illustrated in FIG. 2. The brake carrier 4 is shown from the application side 9 with the brake carrier horns 5, 6, which are visible here. Inner surfaces 5a, 6a of the brake carrier horns 5, 6 each extend parallel to one another in a y-z plane and, with lower supporting sections 4a of the brake carrier 4, each form one of two brake pad slots, which each support the pad carriers 8 of the brake pad 30a in the circumferential direction, i.e. on the leading side and the trailing side (in relation to the preferred direction of rotation of the brake disc 2 around the brake disc rotational axis 2a) and at the bottom in the negative z direction. Here, the inner surfaces 5a, 6a of the brake carrier horns 5, 6 are in contact with respective side faces 8a of the pad carrier 8, wherein support sections 8b on the underside of the pad carrier 8 rest on the supporting sections 4a of the brake carrier 4.

Arranged on an upper side 8c of the pad carrier 8 is a pad spring 31, which interacts with the pad holder 11 (see FIGS. 1 and 3) in the installed state of the brake pad 30a, wherein a force in the negative z direction acts on the brake pad 30a, pressing into the pad slot against the supporting sections 4a of the pad carrier 4.

Figures 3, 3A, 4, 4A:
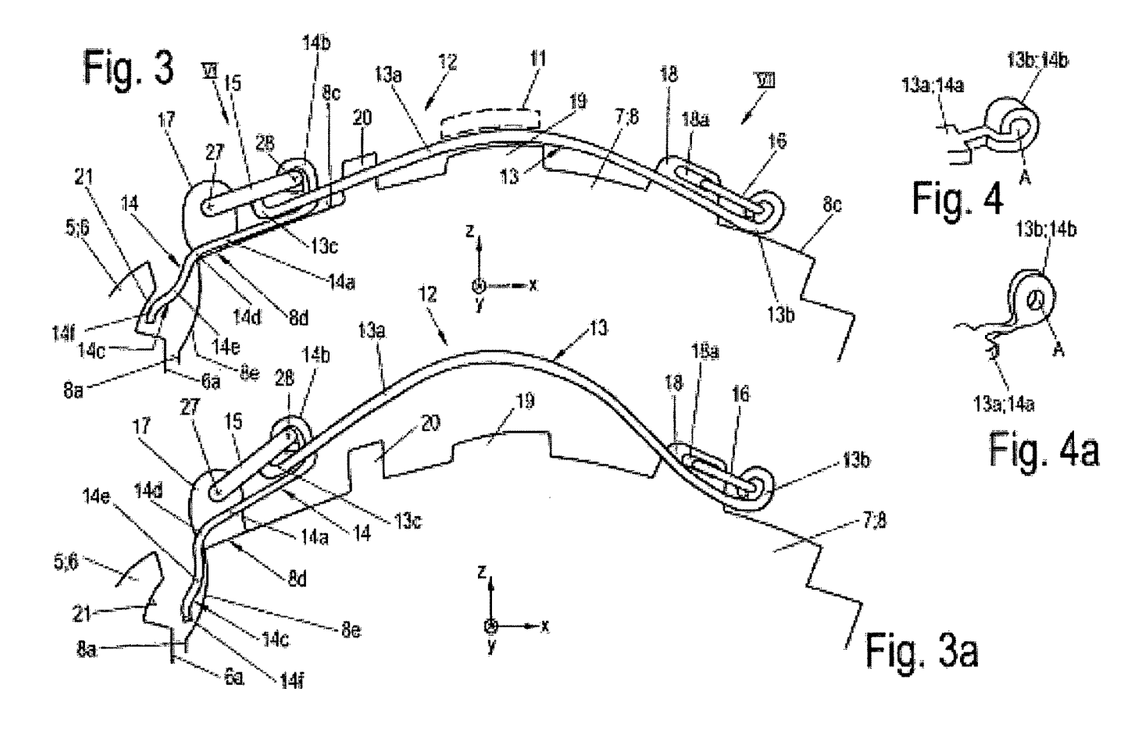
FIG. 3 shows a lateral schematic partial view of a first illustrative embodiment of a brake pad according to the invention having a locking device in a locked position.
FIG. 3a shows the illustrative embodiment according to FIG. 3 in an unlocked position.
FIGS. 4-4a show perspective schematic views of coupling sections.

FIG. 3 shows a lateral schematic partial view of an illustrative embodiment of the brake pad 30, 30' according to the invention with the locking device 12 in a locked position. In FIG. 3a, the illustrative embodiment according to FIG. 3 is shown in an unlocked position.

FIG. 3 and FIG. 3a each show only the upper region of the pad carrier 8 of brake pad 30 without the friction pad 7, from the application side 9 (see FIG. 1 and coordinate system), wherein an upper section of one of the brake carrier horns 5, 6 is illustrated with the inner surface 6a adjacent to the side face 8a of the pad carrier 8 of brake pad 30.

The descriptions for FIGS. 3-3a and others also apply, of course, to the other brake pad 30' which is not shown.

On its upper side 8c, which is of slightly convex design (matched to the radius of the brake disc 2) in the positive z direction, the pad carrier 8 is provided on the left with a projection 17 extending in the z direction. On the opposite, right-hand side, a further projection is formed integrally as a bearing projection 18, likewise extending in the z direction. A supporting projection 19 is arranged approximately centrally between these projections 17, 18. Between this supporting projection 19 and projection 17, the upper side 8c of the pad carrier 8 is formed with a guide projection 20.

At the left-hand corner of the pad carrier 8, the upper side 8c merges by means of a slightly convex transitional section 8d into a downward-extending moulded concave recess 8e, which is then adjoined by the side face 8a extending in the negative z direction. Here, the term "concave" in connection with the recess 8e should be taken to mean that a center of curvature of the recess 8e lies outside the pad carrier 8. The upper section of the respective pad carrier horn 5, 6, which is arranged opposite the recess 8e, is provided with an undercut-type recess 21. Both recesses 8e and 21 extend in the y direction; their functions are explained in detail below.

The locking device 12 is arranged on the upper side 8c of the pad carrier 8 of the brake pad 30, 30' and includes a spring element 13 and a locking element 14. In this first illustrative embodiment, the locking device furthermore has a first coupling member 15 and a second coupling member 16.

The spring element 13 is formed with a flat spring body 13a, which is bent upwards here. On the right-hand side, the spring body 13a has a bearing end 13b and, on the opposite side, has a coupling section 13c with a free end bent over upwards. A length of said bent over end corresponds approximately to twice the thickness of the spring body 13a.

The second coupling member 16 is pivotably attached to the bearing end 13b. The coupling section 13c of the spring element 13 is coupled movably to the locking element 14.

The locking element 14 comprises a flat body 14a of approximately straight design, a coupling section 14b and a locking section 14c. At its right-hand end, which faces the spring element 13, the body 14a is provided with the coupling section 14b. The left-hand end of the body 14a is connected to the locking section by a first, convex arc section 14d, which is bent downwards. Adjoining this first arc section 14d is a second, concave arc section 14e, which merges into a locking end 14f, which is bent downwards. Thus, the arc sections 14d, 14e and the locking end 14f of the locking section 14c of the locking element 14 are of undulating design.

The coupling section 14b of the locking element 14 is connected to the coupling section 13c of the spring element 13, on the one hand, and to the first coupling member 15, on the other hand.

The coupling members 15, 16 are designed in the manner of chain links, for example. Shapes and variations are described in detail in connection with FIGS. 6 to 8.

The first coupling member 15 is pivotably coupled by means of its right-hand end to the coupling section 14b of the locking element 14 at a pivoting axis 28. The other, left-hand end of the first coupling member 15 is pivotably coupled to projection 17 at a further pivoting axis 27. The pivoting axes 27 and 28 extend in the y direction, parallel to the brake disc rotational axis 2a.

The first coupling member 15 extends over the body 14a of the locking element 14, wherein the coupling section 13c of the spring element 13 is arranged between the first coupling member 15 and the body 14a of the locking element 14. That end of the coupling section 13c which is bent over upwards lies under the first coupling member 15, wherein the underside of the coupling section 13c rests on part of the upper side of the body 14a of the locking element 14.

A coupling of the locking element 14 and of the coupling section 13c of the spring element 13 is formed by a positive joint, with the coupling section 14b of the locking element 14 being passed through a slot 13e (see FIG. 6) in the coupling section 13c of the spring element 13. The side of the first coupling member 15 which is connected to the coupling section 14b of the locking element 14 at pivoting axis 28 prevents the coupling section 14b from sliding back through the slot 13e.

By means of its right-hand end, the second coupling member 16 is coupled pivotably to the bearing end 13b of the spring element 13. The other, left-hand end of the second coupling member 16 is coupled to projection 18 in a slotted hole 18a in such a way as to be pivotable about an axis in the y direction, parallel to the brake disc rotational axis 2a, and so as to be movable in an x-z plane. The second coupling member 16 extends from the bearing end 13b of the spring element 13 over the spring body 13a of the spring element 13 in a partial area.

The spring element 13 extends on the upper side 8c of the pad carrier 8 from the right, adjacent to the bearing projection 18, through the position of the bearing end 13b defined by the second coupling member 16, approximately as far as the center under the first coupling member 15. This position is determined by the first coupling member 15 and the positive joint of the coupling of the locking element 14 with the coupling section 13c of the spring element 13.

In the unlocked position of the locking device 12, which is shown in FIG. 3a, the brake pad 30, 30' is inserted into the brake carrier 4, but the pad holder 11 has not yet been fitted. Owing to its pre-stress, the spring element 13 is bent upwards, wherein the bearing end 13b together with the second coupling member 16 is shifted by a certain amount to the left towards the center. This shift is made possible by the slotted hole 18a in the bearing projection 18, in which the second coupling member 16 is arranged in a manner which allows sliding and pivoting. Moreover, the pivotable coupling of the bearing end 13b to the second coupling member 16 allows a pivoting movement of the spring element 13 in the y direction about a pivoting axis.

Since the spring element 13 is bent upwards, the left-hand end of the spring element 13, which is coupled by the coupling section 13c to the coupling section 14b of the locking element 14 and, via the latter, to the first coupling member 15, is bent downwards. Owing to the positive guidance by the first coupling member 15, this is pivoted upwards in the projection 17 at pivoting axis 27. This has the effect that the locking element 14 coupled to the first coupling member 15 by way of the other pivoting axis 28 is also pivoted about pivoting axis 27 in such a way that the locking section 14c of the locking element 14 is received in the recess 8e of the pad carrier 8. In this case, the locking end 14f of the locking section 14c is accommodated in the recess 8e to such an extent that it does not project beyond the side face 8a in the negative x direction. This makes possible insertion of the brake pad 30, 30' with the pad carrier 8 between the inner surfaces 5a, 6a of the pad carrier horns 5, 6 without hindrance by the locking section 14c of the locking element 14 of the locking device 12.

The brake pads 30, 30' are inserted into the brake disc 1 in the respective pad slots between the associated brake carrier horns 5, 6 and 5', 6', respectively, in the unlocked position of their locking devices 12, which is adopted as explained above owing to the prestress of the spring element 13. The pad holder 11 (in dashed lines) is then fitted in the negative z direction and fixed in order to adopt the locking position of the locking device 12, which is shown in FIG. 3. During the fitting of the pad holder 11, the locking devices 12 of the inserted brake pads 30, 30' are now moved automatically out of the unlocked position into the locking position. During removal of the brake pads 30, 30', the pad holder 11 is removed, with the result that the locking devices 12 are moved back automatically into the respectively unlocked position by the prestress of their spring elements 13.

As a result, the spring element 13 is pressed towards the supporting projection 19. Here, the supporting projection 19 forms a limit for the spring travel of the spring element 13 in the negative z direction. In the locking position of the locking device 12, the spring element 13 does not rest on the supporting projection 19 but is arranged at a certain small distance (clearance) above the supporting projection 19. The bearing end 13b of the spring element 13 is pressed outwards to the right and rests on the upper side 8c of the pad carrier 8, but its movement is limited by the second coupling member 16 and the slotted hole 18a in the bearing projection 18. At the same time, the spring element 13 presses with a defined force, via the coupling with its coupling section 13c, on the locking element 14, which, for its part, pivots clockwise in a circular path around pivoting axis 27, owing to the coupling with the first coupling member 15, until the underside of the body 14a of the locking element 14 comes to rest on the upper side 8c of the pad carrier 8. In this case, the locking end 14c of the locking element 14 pivots clockwise out of the recess 8e and enters into engagement with the recess 21 of the associated brake carrier horn 5, 6.

Figure 6:
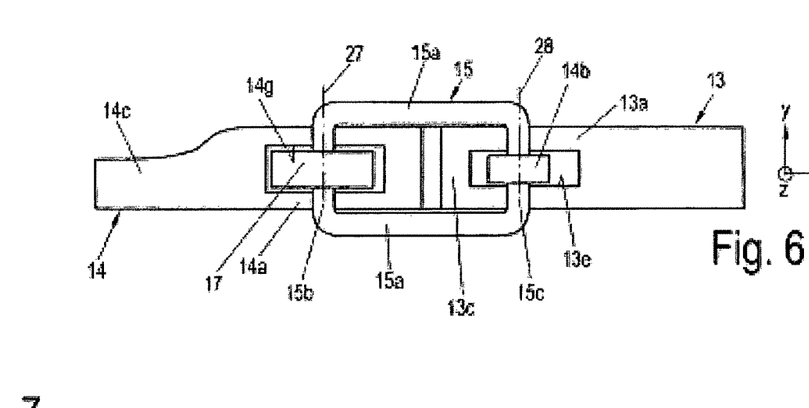

In the locked position of the locking device 12, the locking element 14 is, on the one hand, fixed radially by the spring element 13 and tangentially by the correspondingly shaped projection 17 on the pad carrier 8 (see FIG. 6). Automatic unlocking of the locking device 12 is thus prevented. In this way, the brake pad 30 is secured against being lifted off in a tangential direction.

The pressing on of the locking element by means of the defined force of the spring element 13 excludes overloading. If the force acting is too great, e.g. due to a brake pad 30 climbing in the z direction, during braking counter to the envisaged main braking direction, the locking section 14c of the locking element 14 can retract into the recess 8e in the pad carrier 8.

A defined clearance is provided between the locking end 14f of the locking section 14c of the locking element 14 and the upper edge of the undercut-type recess 21 in the brake carrier horn 5, 6, said clearance ensuring that the movement force on the brake caliper 3 designed as a sliding caliper in the y direction does not rise to an unwanted level.

The spring element 13 slides over the operating path with the coupling section 13c on the body 14a of the locking element 14. As a result, wear on the pad carrier 8 in this area and thus an increase in the clearance between the locking element 14 and the undercut-type recess 21 in the brake carrier horn 5, 6 is avoided.

Perspective schematic views of coupling sections 14b of the locking element 14 and also bearing ends 13b of the spring element 13 are shown by way of example in FIGS. 4 and 4a.

FIG. 4 shows an embodiment as a stamped/bent part, wherein the coupling section 14b or the bearing end 13b is rolled up in order to obtain a coupling opening A for coupling with a coupling member 15, 16.

A stamped/bent part is likewise used in FIG. 4a. However, the opening A is produced by a stamping or drilling process. A higher tolerance of the opening A can be possible. The end is moved into the corresponding position of the associated pivoting axis by rotation about the longitudinal axis of the spring body 13a or body 14a.

Figures 5, 5A:
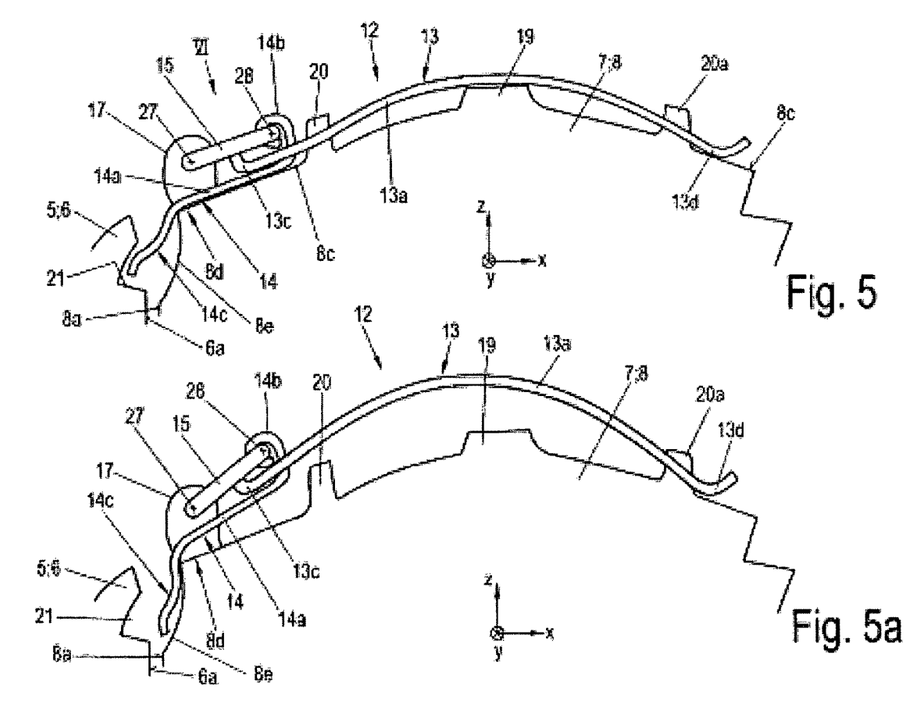

FIG. 5 shows a lateral schematic partial view of a variant of the first illustrative embodiment according to FIG. 3 in the locking position of the locking device 12. FIG. 5a shows a lateral schematic partial view of the variant according to FIG. 5 in the unlocked position of the locking device 12.

In this variant, the pad carrier 8 is provided with a guide projection 20a on its upper side 8c instead of the bearing projection 18.

In contrast to the embodiment according to FIGS. 3 and 3a, the locking device 12 includes only the first coupling member 15. The coupling between this, the spring element 13 and the locking element 14 has already been described above, as has the design of the locking element 14.

In this variant, the spring element 13 has a support end 13d instead of the bearing end 13b. The support end 13d is provided with a larger bending radius than the end of the coupling section 13c. The spring body 13a has another slot 13f (see FIGS. 10, 11 and 13), which is adjacent to the support end 13d. The other slot 13f is arranged around the pad carrier 8 and, in interaction with the guide projection 20a, ensures guidance of the spring element 13.

In the locked position of the locking device 12, the spring element 12 is arranged at the distance above the supporting projection 19 which has already been explained in connection with FIG. 3a. The support end 13d rests on the upper side 8c of the pad carrier 8, wherein the coupling section 13c is arranged between the first coupling member 15 and the locking element 14 and the coupling section 13c rests by means of its underside on the upper side of the locking element 14 and presses it onto the upper side 8c of the pad carrier 8.

FIG. 6 shows a schematic plan view in direction VI according to FIGS. 3-3a and 5-5a.

It can clearly be seen here, as already explained above, that the coupling section 14b of the locking element 14 is guided by the, in this case rectangular, slot 13e in the spring element 13 in the transition between the spring body 13a and the coupling section 13c. The slot 13e is provided with a relatively large play in the x direction, thereby improving a longitudinal movement of the spring element 13.

Here too, the body 14a of the locking element 14 is provided with a rectangular opening 14g, through which the projection 17 extends. In this way, the locking element 14 is fixed tangentially, i.e. in the x direction, wherein a small play is provided in the x direction in contrast to the large play of the opening 13e in the spring element 13.

Here, the first coupling member 15 is designed as a kind of chain-link and has two longitudinal sections 15a extending parallel to one another in the x direction, which are connected to coupling sections 15b and 15c arranged at right angles thereto. At least the coupling sections 15b and 15c have a circular cross-section. In this case, the left-hand coupling section 15b is guided through a hole (not shown but easily imagined) in the projection 17, and supported in said hole in such a way that it can be pivoted about pivoting axis 27. The right-hand coupling section 15c is inserted through the opening A (see FIGS. 4-4a) in the coupling section 14b of the locking element 14 and supported in said opening in such a way that it can be pivoted about pivoting axis 28.

Figure 7:
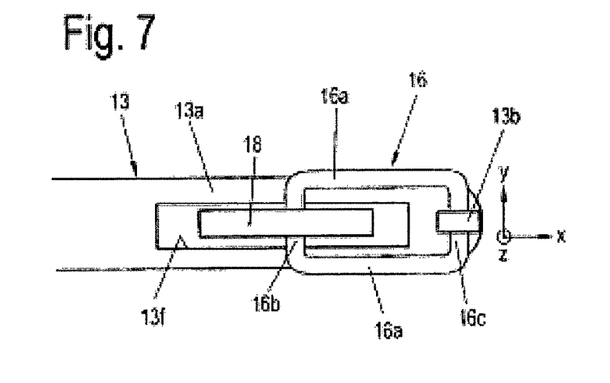
Figure 7A:
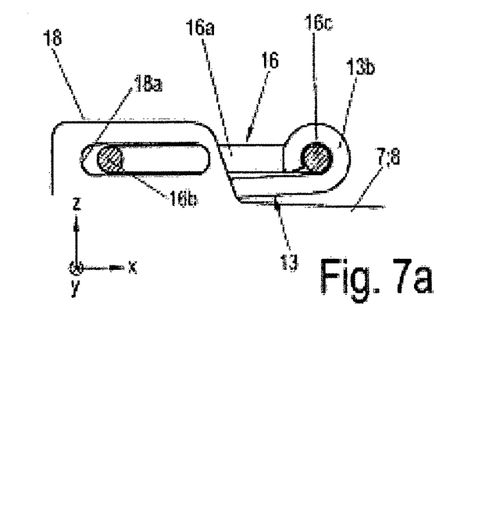
FIG. 7a shows a schematic side view of a partial area according to FIG. 7.

FIG. 7 shows a schematic plan view in direction VII according to FIGS. 3-3a and 5-5a. In FIG. 7a there is a schematic side view of a partial area according to FIG. 7 as seen in the y direction, wherein the coupling member 16 is shown in an x-z plane.

The right-hand end section of the spring body 13a of the spring element 13 also has a rectangular slot 13f, through which the bearing projection 18 extends in the z direction. Slot 13f is also provided with a relatively large play in the x direction, thereby improving a longitudinal movement of the spring element 13.

Here, the second coupling member 16 is also designed as a kind of chain-link and, like the first coupling member 16, has two longitudinal sections 16a, which extend parallel to one another in the x direction and are connected to coupling sections 16b and 16c arranged at right angles thereto. At least the coupling sections 16b and 16c have a circular cross-section. In this case, the left-hand coupling section 16b is guided by the slotted hole 18a in the bearing projection 18 and is supported in the latter in such a way that it can pivot about a pivoting axis and slide. The right-hand coupling section 16c is inserted through the opening A (see FIGS. 4-4a) in the bearing end 13b and is supported therein in such a way that it can be pivoted about a pivoting axis (not specifically designated).

Figure 8:
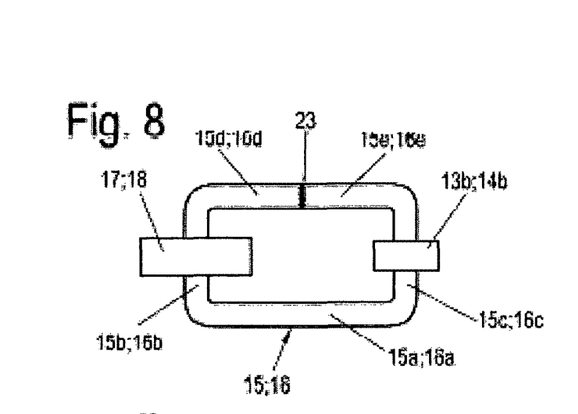
Figure 8A:
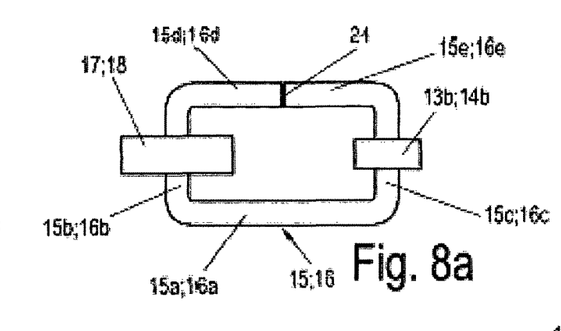
Figures 8B, 8C, 8D:
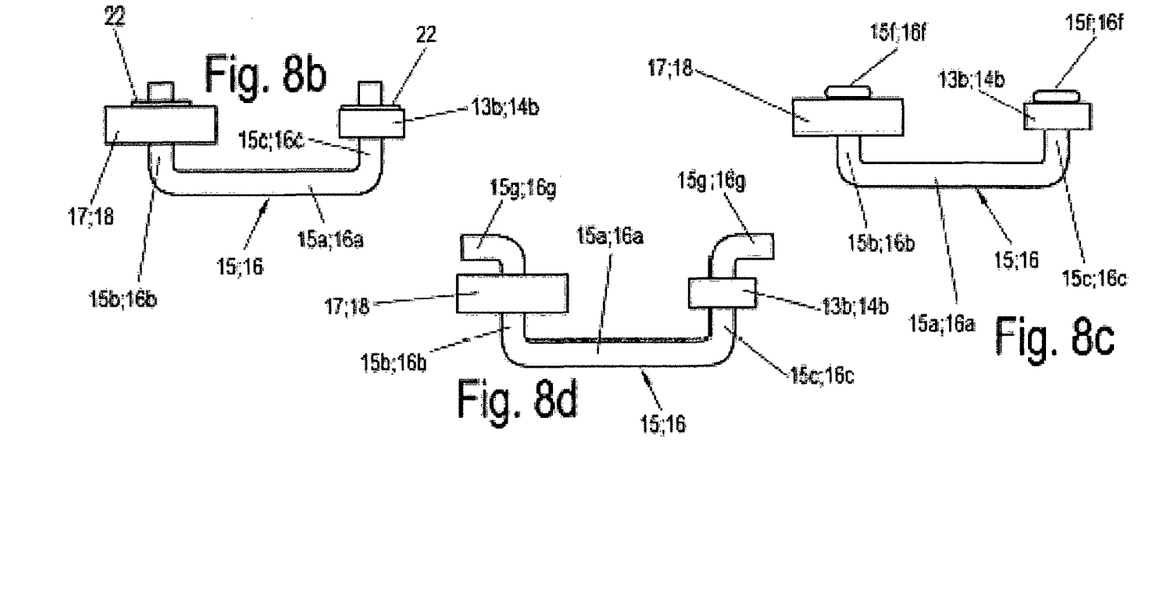

FIGS. 8 to 8d illustrate various variants of the coupling members 15, 16 in schematic plan views according to FIGS. 6 and 7.

FIG. 8 shows a coupling member 15, 16 in an embodiment as a chain-link, wherein a basic shape (not shown), e.g. in U form, is initially inserted by means of the coupling sections 15b, 16b and 15c, 16c through projections 17, 18 and bearing end 13b or coupling section 14b. The longitudinal sections 15d, 16d and 15e, 16e are then bent over and are connected at the points of abutment by a material joint 23, e.g. by welding or hard soldering. As FIG. 8a shows, there can also be a gap 24 remaining without a joint. However, other means of connection (clips or the like) are also possible.

In FIG. 8b, a U-shape with just one longitudinal section 15a, 16a is provided as a coupling member 15, 16, wherein the coupling sections 15b, 16b and 15c, 16c are fixed axially relative to the bearing locations in projections 17, 18 and bearing end 13b or coupling section 14b by axial retention means 22, e.g. shaft retention rings. In this case, the sides of the coupling sections 15b, 16b and 15c, 16c which lie opposite the axial retention means 22 can also have axial retention means 22 or shaft shoulders.

As a further variant, FIG. 8c shows axial securing of the inserted end sections 15f, 16f of the coupling sections 15b, 16b and 15c, 16c by means of radial riveting or spot welds.

A variant according to FIG. 8d with bent-over end sections 15g, 16g is, of course, also possible.

Figures 9, 9A:
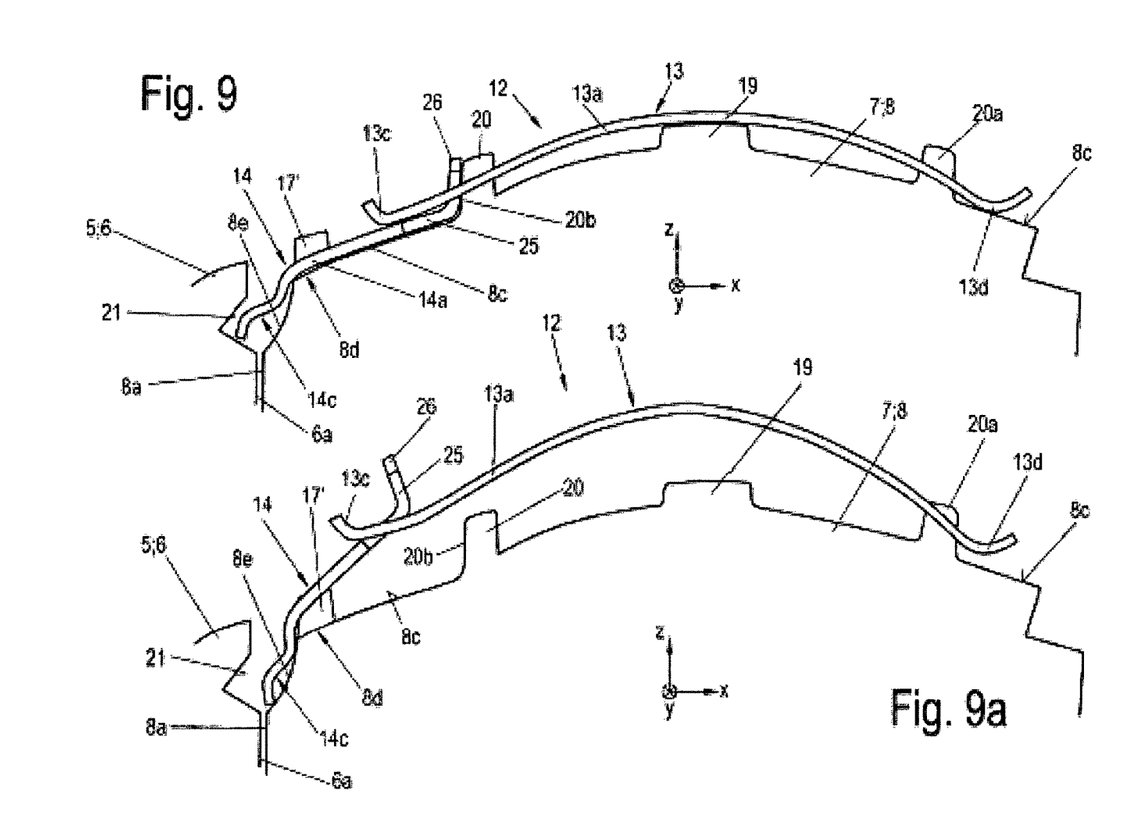
FIGS. 9-9a show lateral schematic partial views of a second illustrative embodiment of the brake pad according to the invention.
Figures 10, 11, 12, 13:
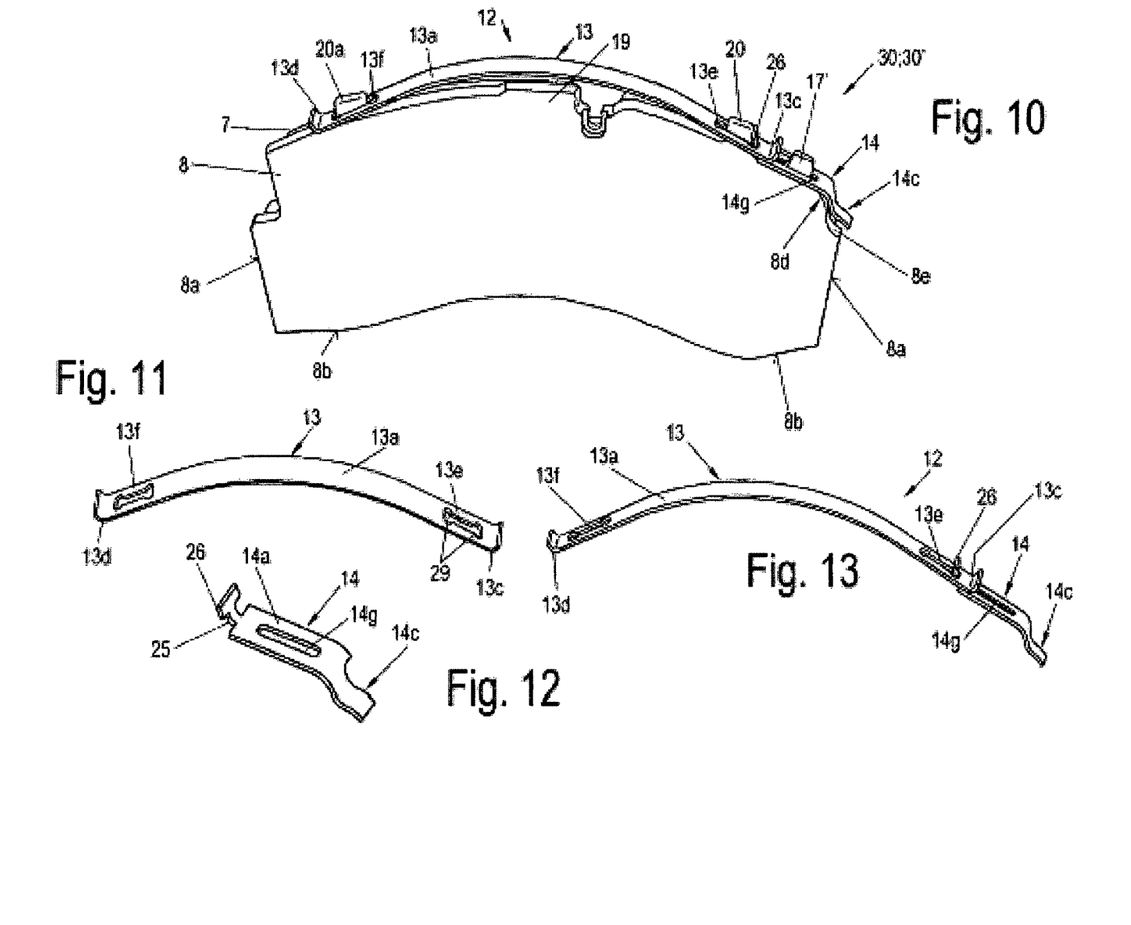

A lateral schematic partial view of a second illustrative embodiment of the brake pad 30, 30' according to the invention with the locking device 12 in the locking position is illustrated in FIG. 9. FIG. 9a shows the locking device 12 in the corresponding unlocked position. FIG. 10 is a schematic perspective view of the second illustrative embodiment of the brake pad 30, 30' according to the invention shown in FIGS. 9-9a. A schematic perspective view of the spring element 13 is illustrated in FIG. 11. FIG. 12 shows a schematic perspective view of the locking element 14, and a schematic perspective view of the locking device 12 of the second illustrative embodiment of the brake pad according to the invention shown in FIGS. 9-9a is illustrated in FIG. 13.

In the second illustrative embodiment, the pad carrier 8 does not have bearing projections on its upper side 8c but guide projections 17', 20, 20a and the supporting projection 19.

In contrast to the embodiment according to FIGS. 5 and 5a, the locking device 12 is in two parts and comprises only the spring element 13 and the locking element 14.

Here, the spring element 13 has the support end 13d according to FIGS. 5-5a instead of the bearing end 13b. The spring body 13a is provided with respective slots 13e, 13f in each end region and, as a result, the spring element 13 is secure when installed, without attention being paid to the ends. In this embodiment, the slots 13e, 13f have a double-T shape, and it is therefore possible for the connecting section 25 to rest directly against the narrow side of the associated slot 13e.

One slot 13e interacts with guide projection 20, and the other slot 13f interacts with guide projection 20a. The guide projections 20 and 20a extend in the z direction through the associated slots 13e, 13f.

Instead of being provided with the coupling section 14b, the locking element 14 is provided with a transverse end 26 extending in the y direction, which is connected by a narrow, bent connecting section 25 to the body 14a of the locking element 14 to give a T shape. A bend in the connecting section 25 to the transverse end 26 corresponds to the shape of a supporting section 20b of guide projection 20, said supporting section facing the side face 8a of the pad carrier 8. A width (at right angles to the longitudinal axis of the locking element 14) of the narrow connecting section 25 corresponds to the width (at right angles to the longitudinal axis of the spring element 13) of slot 13e. The body 14a of the locking element 14 is furthermore penetrated by a slot-shaped opening 14g, which interacts with projection 17'. Projection 17' extends through the opening 14g in the z direction. The locking section 14c of the locking element 14 has already been described above.

A coupling between the spring element 13 and the locking element 14 is embodied in such a way that the transverse end 26 is inserted by means of the narrow connecting section 25 of the locking element 14 through slot 13e and forms a mobile positive coupling with the spring element 13.

During assembly of the locking device 12, the spring element 13 is initially arranged in such a way that its convex arc faces upwards. The locking element 14 is then initially turned in such a way that the transverse end 26 is in alignment with the slot 13e of the spring element 13. The transverse end 26 is then inserted from below through slot 13e in such a way that the connecting section 25 is accommodated in slot 13e. Finally, the connecting section 25 of the locking element 14 is turned in slot 13e in such a way that the longitudinal direction of the locking element 14 is in alignment with the longitudinal direction of the spring element 13.

The assembled locking device 12, which is shown in FIG. 13 can then be placed in a simple manner on the upper side 8c of the pad carrier 8, wherein the projections 20a, 20 and 17' are each accommodated in the associated slots 13f, 13e and the slot-type opening 14g.

In the unlocked position according to FIG. 9a, the locking element 14 is pivoted in such a way by the spring element 13 bent upwards under prestress in the z direction, by way of the coupling comprising the transverse end 26 with the connecting section 25 of the locking element 14 to slot 13e and by means of the interaction between the projection 17' and the slot-shaped opening 14g of the locking element 14, that the locking section 14c is accommodated in the recess 8e of the pad carrier 8, as has already been described above.

In the locked position of the locking device 12, the spring element 12 is arranged at a certain small distance above the supporting projection 19, as already described above (the pad holder is not shown but is arranged as in FIG. 3, which is easy to imagine). The support end 13d rests on the upper side 8c of the pad carrier 8, wherein the coupling section 13c rests by means of its underside on the upper side of the locking element 14 and presses it onto the upper side 8c of the pad carrier 8. The body 14a of the locking element 14 is shaped so as to correspond to the contour of the upper side 8c of the pad carrier 8. The bent connecting section 25 and the transverse end 26 are configured in such a way that they correspond to the contour of the supporting section 20b and the transition thereof to the upper side 8c. In this case, the locking element 14 rests by means of the body 14a on the upper side 8c, and the bent connecting section 25 and the transverse end 26 hug the contour of the transition between the upper side 8c and the supporting section 20b.

In this second illustrative embodiment too, the locking section 14c of the locking element 14 is in engagement with the undercut-type recess 21 of the associated brake carrier horn 5, 6 in the locked position of the locking device 12.

In the first illustrative embodiment according to FIGS. 3-3a and the variant according to FIGS. 5-5a too, the guide section 20 (and also 20a) interacts with the slot 13e (13f) in the spring element 13, as can easily be imagined from FIG. 10.

In the locked position of the locking device 12, the securing element 14 forms a travel limitation with a defined play, which is free of force in the installed state, thereby ensuring that the capacity for movement of the brake caliper 3 is not increased.

Moreover, in the event of overload the securing element 14 can lift off counter to the spring force of the spring element 13 in the installed state and thus includes a built-in overload safeguard.

Particularly in the case of the second illustrative embodiment, the locking device 12 can also be removed again, once the pad holder 11 has been removed.

The invention is not restricted by the illustrative embodiments described above but can be modified within the scope of the attached claims. Thus, for example, it is contemplated for the coupling between the first coupling member 15 and the projection 17 at the pivoting axis 27 to be designed as a pivotable clip-type joint.

The coupling sections 15b-c and 16b-c of the coupling members 15, 16 can also be formed with corresponding bushes at the respective pivoting axes.

On the one hand, the supporting projection 19 can also be a projection with only a low height in the z direction, or can be formed directly by a section of the upper side 8c of the pad carrier 8.

Instead of the double-T shape, it is also possible for the slots 13e, 13f to have some other shape, e.g. rectangular with rounded corners.

The brake pads 30, 30' can be used in all disc brakes 1, in particular for commercial vehicles.

It is contemplated for the locking device 12 to be moved out of the unlocked position into the locking position by a separate actuating component or a separate actuating device. An actuating component of this kind could be provided in the pad holder 11 or separately from this for each brake pad 30, 30', for example, and could be actuated by use of a tool, for example. For example, a bolt that can be rotated and moved in the longitudinal direction by way of a screwdriver and has a bayonet catch is contemplated as an actuating component. Of course, other embodiments are also possible.

LIST OF REFERENCE SIGNS 1 disc brake
2 brake disc
2a brake disc rotational axis
3 brake caliper
4 brake carrier
4a supporting section
5, 5'; 6, 6' brake carrier horn
5a; 6a inner surface
7, 7' friction pad
8, 8' pad carrier
8a side face
8b support section
8c upper side
8d transitional section
8e recess
9 application side
10 reaction side
11 pad holder
12, 12' locking device
13 spring element
13a spring body
13b bearing end
13c coupling section
13d support end
13e-f slot
14 locking element
14a body
14b coupling section
14c locking section
14d, 14e arc section
14f locking end
14g opening
15; 16 coupling member
15a; 16a longitudinal section
15b-c; 16b-c coupling section
15d-e; 16d-e longitudinal section 15f-g, 16f-g end section
17, 17' projection
18 bearing projection
18a slotted hole
19 supporting projection
20, 20a guide projection
20b supporting section
21 recess
22 axial retention device
23 joint
24 gap
25 connecting section
26 transverse end
27; 28 pivoting axis
29 widened portion
30, 30', 30a brake pad
31 pad spring
A coupling opening
x, y, z coordinates The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pad of a disc brake, comprising:
   a pad carrier;
   a friction pad mounted on the pad carrier; and
   a locking device arranged on the pad carrier and having a spring element and a securing element, wherein
   the spring element and the securing element of the locking device are coupled positively to one another as two separate parts and are pivotable relative to one another, and
   the locking device is movable between an unlocked position in which a locking section of the securing element is accommodated in a recess in the pad carrier, and a locking position in which a predetermined length of the locking section of the securing element projects laterally from the pad carrier to interact with an adjacent brake carrier horn of the disc brake when the brake pad is in an installed position in the disc brake.

2. The brake pad according to claim 1, wherein:
   the spring element has a slot extending in a longitudinal direction of the spring element in each end region of a spring body, and
   the securing element has a body having a slot-type opening, wherein the body is formed at one end with the locking section and is coupled at another end to the spring element.

3. The brake pad according to claim 2, wherein the spring element and the securing element are coupled positively by the slot in a coupling section in one end region of the spring element being in engagement with the other end of the securing element.

4. The brake pad according to claim 3, wherein:
   the other end of the securing element, which is the end in engagement with the slot in the spring element, has a narrow connecting section, which connects the body of the securing element to a transverse end, and
   the narrow connecting section is accommodated movably in the slot in the coupling section of the spring element.

5. The brake pad according to claim 4, wherein:
   the locking device is arranged on an upper side of the pad carrier in a manner which allows it to be removed again such that a projection of the pad carrier is arranged in the slot-type opening in the securing element,
   a guide projection of the pad carrier is arranged in the slot in the coupling section of the spring element, and
   a further guide projection of the pad carrier is arranged in the slot in the spring element.

6. The brake pad according to claim 5, wherein:
   the locking device is arranged on the upper side of the pad carrier in a manner which allows it to be removed again such that a support end of the spring element, said end being adjacent to the other slot in the spring element, rests on the upper side of the pad carrier in the locking position of the locking device, and
   the coupling section of the spring element rests by way of its underside on an upper side of the securing element and presses the securing element onto the upper side of the pad carrier.

7. The brake pad according to claim 3, wherein:
   the other end of the securing element, which is the end in engagement with the slot in the spring element, has a coupling section having a coupling opening, and
   a section between the body of the securing element and the coupling section is accommodated movably in the slot in the coupling section of the spring element.

8. The brake pad according to claim 7, wherein the locking device further comprises a coupling member, which is connected pivotably to the coupling section of the securing element at a pivoting axis, and which is connected pivotably to a projection on the upper side of the pad carrier at a further pivoting axis.

9. The brake pad according to claim 8, wherein:
   the coupling member has at least one longitudinal section, which is connected at its ends to respective coupling sections, and
   one coupling section is connected pivotably to the coupling section of the securing element and one coupling section is connected pivotably to the projection.

10. The brake pad according to claim 9, wherein the coupling member is designed as a chain link.

11. The brake pad according to claim 8, wherein:
    the locking device is arranged on an upper side of the pad carrier in such a way that a projection of the pad carrier is arranged in the slot-type opening in the securing element,
    a guide projection of the pad carrier is arranged in the slot in the coupling section of the spring element, and
    a further guide projection of the pad carrier is arranged in the slot in the spring element, wherein the coupling member is connected pivotably to the projection of the pad carrier at a pivoting axis.

12. The brake pad according to claim 11, wherein:
    the locking device is arranged on an upper side of the pad carrier in such a way that a support end of the spring element, said end being adjacent to the other slot in the spring element, rests on the upper side of the pad carrier in the locking position of the locking device,
    the coupling section of the spring element is arranged between the first coupling member and the securing element, and
    the coupling section of the spring element rests by way of its underside on the upper side of the securing element and presses the securing element onto the upper side of the pad carrier.

13. The brake pad according to claim 12, wherein:
    the locking device is arranged on the upper side of the pad carrier in a manner which allows it to be removed again in such a way that the coupling member is formed in a U shape with an axial retention device that can be removed again, and/or the connection of the coupling member to the projection or to the coupling section of the securing element is designed as a clip-type joint.

14. The brake pad according to claim 8, wherein the locking device further has a further coupling member, which is connected pivotably to a bearing end of the spring element, said bearing end being formed with an opening, and which is connected pivotably to a bearing projection on the upper side of the pad carrier.

15. The brake pad according to claim 14, wherein the further coupling member is connected to the bearing projection in a manner which allows pivoting and sliding.

16. The brake pad according to claim 14, wherein the further coupling member has at least one longitudinal section, which is connected at its ends to respective coupling sections, wherein one coupling section is connected pivotably to the bearing end of the spring element and one coupling section is connected pivotally to the bearing projection.

17. The brake pad according to claim 14, wherein the further coupling member is designed as a chain link.

18. The brake pad according to claim 14, wherein:
the locking device is arranged on an upper side of the pad carrier in such a way that the projection of the pad carrier is arranged in the slot-type opening in the securing element,
a guide projection of the pad carrier is arranged in the slot in the coupling section of the spring element, and
a bearing projection of the pad carrier is arranged in the slot in the spring element, wherein the coupling member is connected pivotably to the projection of the pad carrier at a pivoting axis, and wherein the further coupling member is connected pivotally to the bearing projection.

19. The brake pad according to claim 18, wherein:
the locking device is arranged on the upper side of the pad carrier in such a way that the support end of the spring element rests on the upper side of the pad carrier in the locking position of the locking device,
the coupling section of the spring element is arranged between the first coupling member and the securing element, and
the coupling section of the spring element rests by way of its underside on the upper side of the securing element and presses the securing element onto the upper side of the pad carrier.

20. The brake pad according to claim 14, wherein:
the locking device is arranged on the upper side of the pad carrier in a manner which allows it to be removed again in such a way that the further coupling member is formed in a U shape with an axial retention device that can be removed again, and/or
the connection of the further coupling member to the bearing projection or to the bearing end of the spring element is designed as a clip-type joint.

21. A brake system of a disc brake, comprising:
a brake carrier horn;
a pad carrier;
a friction pad mounted on the pad carrier; and
a locking device arranged on the pad carrier and having a spring element and a securing element, wherein
the spring element and the securing element of the locking device are coupled positively to one another as two separate parts and are pivotable relative to one another, and
the locking device is movable out of an unlocked position, in which a locking section of the securing element is accommodated in a first recess in the pad carrier, into a locking position, in which the locking section of the securing element projects laterally from the pad carrier in order to interact with a second recess in the brake carrier horn of the disc brake, and is movable back out of said locking position.

22. A vehicle disc brake for use with a brake disc, the disc brake comprising:
a caliper;
a fixed-location brake carrier, the brake carrier having two pairs of brake carrier horns, wherein each pair of brake carrier horns is configured as a pad slot; and
a pad holder by which respective brake pads are held, wherein
at least one brake pad comprises a friction pad mounted on a pad carrier and includes a locking device arranged on the pad carrier and having a spring element and a securing element, the spring element and the securing element of the locking device being coupled positively to one another as two separate parts and being pivotable relative to one another,
at least one of the two pairs of brake carrier horns associated with the at least one brake pad comprises a second recess configured to interact with a locking section of the securing element of the brake pad, and
the locking device is movable out of an unlocked position, in which the locking section of the securing element is accommodated in a first recess in the pad carrier, into a locking position, in which the locking section of the securing element projects laterally from the pad carrier in order to interact with the second recess in the at least one of the two pairs of brake carrier horns of the disc brake, and is movable back out of the locking position.

23. The disc brake according to claim 22, wherein the second recess is configured as an undercut.

24. The disc brake according to claim 22, wherein:
the locking device of the at least one brake pad is moved out of the unlocked position, in which the locking section of the securing element is accommodated in the first recess in the pad carrier, into the locking position in which the locking section of the securing element of the pad carrier is in engagement for interaction with the second recess, when the pad holder is fitted to the disc brake.

25. The disc brake according to claim 24, wherein the pad holder moves the locking device of the at least one brake pad automatically out of the unlocked position into the locking position when the pad holder is fitted to the disc brake.

26. The disc brake according to claim 24, wherein at least one separate actuating component is provided for moving the locking device of the at least one brake pad out of the unlocked position into the locking position.

27. The disc brake according to claim 22, wherein the caliper is a sliding caliper.

* * * * *